Patented May 9, 1933

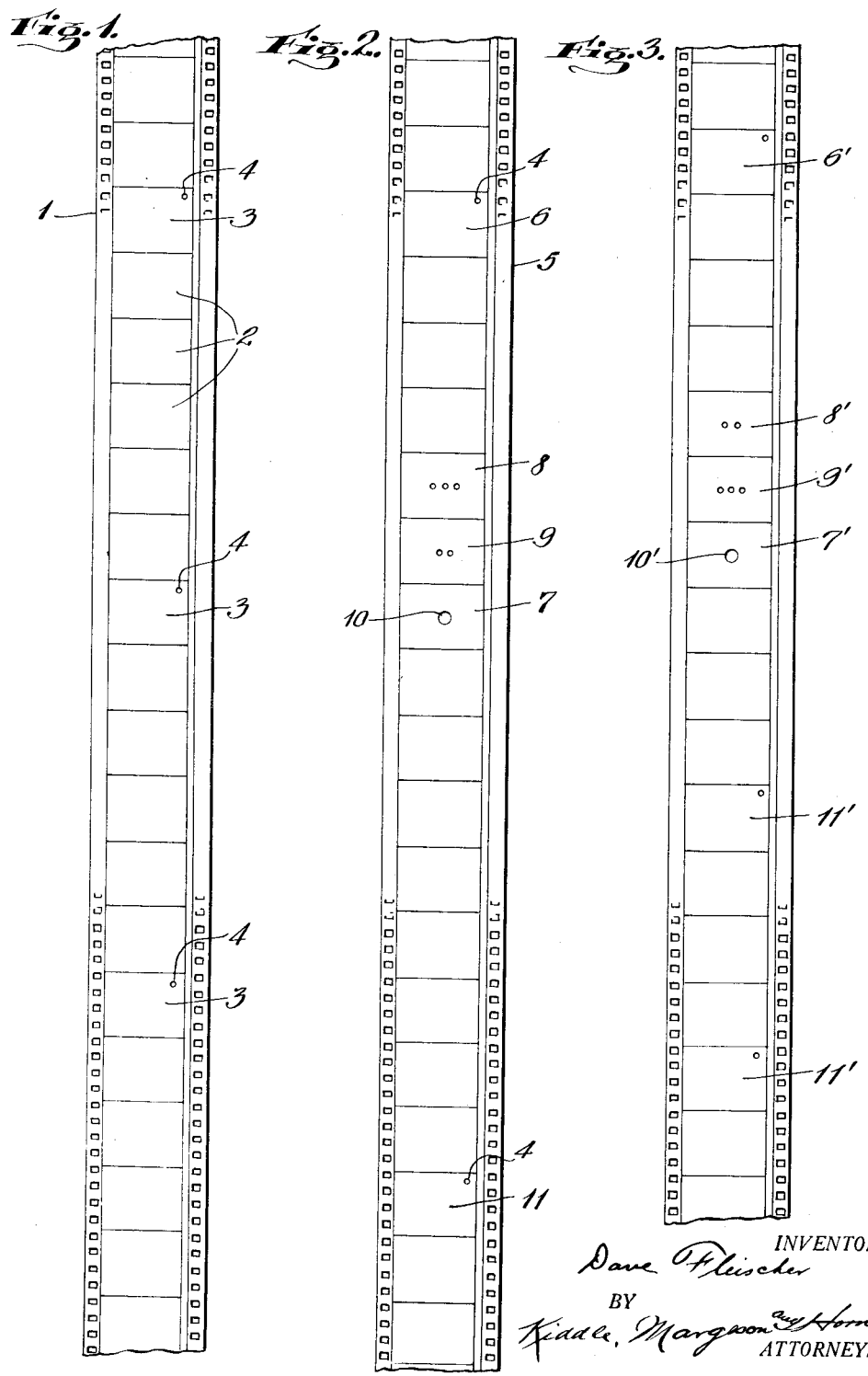

1,907,774

UNITED STATES PATENT OFFICE

DAVE FLEISCHER, OF BROOKLYN, NEW YORK

TEMPO INDICATING MOTION PICTURE FILM

Application filed January 17, 1931. Serial No. 509,306.

This invention relates generally to the making of sound synchronized motion pictures where the sound is recorded and synchronized subsequent to the taking of the pictures, and particularly to tempo indicating means carried by a motion picture film for securing proper synchronization of the sound with the motion pictures, especially motion pictures of animated drawings.

One of the objects of my invention is the provision of indicating marks non-photographically applied to the cinematographic print of the motion picture which serve to indicate to the performers, (an orchestra, for instance), the proper tempo at which the music should be played in order to synchronize with the pictures.

Another object of my invention is the provision of means for indicating in advance to the performers the changes occurring in the tempo of the music.

The sound employed with motion pictures of animated drawings is recorded photographically upon a sound track upon the same print which carries the pictures, or recorded upon phonograph discs which are operated synchronously with the film carrying the pictures. At the present time the photographically recorded sound is generally used.

To synchronize the sound selected to accompany the pictures, and which may consist of music, instrumental or vocal, or of dialogue, et cetera, according to present practices, a motion picture print of the pictures is projected before the performers who are to furnish the sound, so that the action may be noted and the tempo of the sound accordingly regulated. After several views of the projected print, assuming that orchestral music is to be employed, the orchestra performs under the guidance of its conductor who watches the action of the projected pictures and times the music accordingly as best he may. This music is recorded and the record is later printed on the sound track of the prints which carry the pictures. This method requires many rehearsals, and at best, indifferent synchronization is secured.

In order to improve upon these results, indicating marks, usually a representation of a conductor's baton, have been photographed upon the negative of the picture film and printed over on the prints thereof, the baton appearing in different positions to indicate the beat, for instance oscillating from right to left, or moving up and down. Such baton representations have been placed within the picture area, or under it, or alongside it, each change in movement or beat of the baton occurring at a preselected picture frame, to which for the sake of brevity I refer as the "beat frame".

While these baton representations serve to improve synchronization, they involve the necessity of photographing the baton or other indicating device in association with the photographing of the drawings.

Furthermore none of these methods give any warning or signal of an approaching change in tempo whereby the conductor of the orchestra may be appraised of an approaching change to which he can accommodate the tempo of his music immediately.

My invention entirely eliminates the skill and expense involved in photographing indicating beat marks upon either the negative or positive film carrying the pictures, and provides not only marks indicating the tempo and an approaching change in tempo but indicates the beginning of the change in a distinctive manner, so that the performers, warned in advance, may immediately adjust the tempo of the sound to the changed conditions.

It will be understood that the beat frames have a definite predetermined position in the film with respect to the other frames of the film. Thus, for instance, assuming the music to be a march in four-fourths time each of the four beats of each bar is assigned to a particular frame of the film, depending upon the tempo of the music and speed of the action.

My method of marking is effective and can be applied quickly and at very little expense.

Fig. 1 is a plan view of a section of a print made in accordance with this invention;

Fig. 2 is a similar view showing the warning marking employed for giving notice to the vocal or instrumental performers of an approaching change in the tempo of the music; and Fig. 3 is a view similar to Fig. 2 but showing a different change in tempo.

Referring to the drawing in detail, 1 designates a print made from a negative of animated drawings, the frames of which I have designated 2, the "beat frames" being designated 3. These beat frames are marked by perforations 4. The print is then projected in the usual way. When the beat frame appears upon the screen, the projection light passing through the perforations 4 and striking the screen will function to clearly distinguish the "beat frames" and serve as a guide to the orchestra conductor of the tempo required and thus enable him to regulate the tempo of the music accordingly. In the example illustrated in Fig. 1 these markings are evenly spaced, there being no change in tempo.

The tempo of the music, as predetermined and marked as aforesaid on the film, is not always constant during the projection of the film. Sometimes it is retarded and at other times accelerated, and my invention provides not only for warning the orchestra leader in advance that a change is approaching but also distinctively marks the frame where the change actually occurs and indicates as well the character of the change to be made.

For the purpose of giving this warning I apply a marking to a frame or frames of the print several frames in advance of the frame at which the change takes place. For instance, where the tempo is to be retarded and with reference now to Fig. 2 of the drawing, it will be seen that the film 5 is provided at 6 and 7 with beat frames which correspond, for example, to the beat frames 3 of Fig. 1. These beat frames will be evenly spaced until the tempo of the music is to be changed. In Fig. 2, a change in tempo occurs at 7, and as a signal of this change, several of the frames preceding 7 are distinctively marked. Thus frame 8 is marked with a different marking from that of the beat frame. In this instance the frame 8 is provided with three holes as distinguished from the single hole of the beat frames.

Intermediate the frame 8 and beat frame 7 is another warning frame designated 9, this frame being provided with only two holes as distinguished from the three holes in frame 8. Frame 7 where the change occurs is distinctively marked by the single perforation 10 which is much larger than the single perforation 4 in the beat frame 6, for instance, and which preferably is placed in a different part of the picture frame than the regular beat mark 4 for instance. As the conductor sees the frames 8 and 9 projected he is warned that the tempo of the music will require a change and by the particular arrangement of the perforations that the tempo is to be retarded and by the distinctive marking of the signal frame 7 of the precise instant of the change in tempo.

The next beat frame which I will designate 11 is located in accordance with the changed tempo as will be understood, and as the tempo is retarded it will be appreciated that a greater number of frames intervenes between frames 11 and 7 than between frames 7 and 6.

In Fig. 3 the tempo is to be accelerated. Consequently the warning frame 8' is provided with two perforations and warning frame 9', with three as distinguished from the reverse order of Fig. 2, thus indicating that the tempo is to be accelerated. It will be understood also that beat frames 7' and 11' are spaced closer together due to the acceleration of tempo than the spacing of beat frames 6' and 7'.

As the music is played in accordance with the signals indicated by the print being projected, it is recorded, and the sound record thus produced is later applied to the sound track of the prints carrying the pictures, so that the final prints carry the pictures with a properly synchronized sound record.

It is to be understood that the particular style of marking above described is illustrative and not employed in a limiting sense inasmuch as obviously the perforations in the beat frames, for instance, are not necessarily of any particular shape or in any particular location or for that matter need the film be perforated at all. My invention embraces any mark non-photographically applied to the beat frames of the print, which are of such character as to distinguish them.

For example, instead of indicating the beats by perforations, the emulsion may be removed from a part of each beat frame or a mark could be stamped, scratched or painted on the film, or the entire frame may be removed and be replaced by another frame which is sufficiently different from the picture film to cause it to be immediately recognized. This difference may be in its color, markings or texture.

Likewise, I have indicated an approaching retard by a gradual decrease in the number of perforations in the warning frames, and an approaching acceleration by a gradual increase, but I do not limit myself to this method of warning, as any method of warning, however applied is within the scope of my invention.

It is to be understood also that where I refer to music in the description of my invention this word is to include or cover sounds of any kind that it may be desired to record.

What I claim is:

1. A motion picture film having a plurality of series of tempo markings punched in the frames thereof and visible upon projection of the film, the markings of each series being equally spaced lengthwise of the film, the spacing of the markings of each series having a definite relation to the speed of the film on projection and the action on the film, and a tempo change marking of different character than the tempo markings intermediate successive series of tempo markings.

2. A motion picture film having a plurality of series of tempo markings punched in the frames thereof and visible upon projection of the film, the markings of each series being equally spaced lengthwise of the film, the spacing of the markings of each series having a definite relation to the speed of the film on projection and the action on the film, a tempo change marking of different character than the tempo markings intermediate successive series of tempo markings, and warning markings preceding the change markings and of a different character than the tempo markings and tempo change markings.

3. A motion picture film having a plurality of series of tempo markings punched in the frames thereof and visible upon projection of the film, the markings of each series being equally spaced lengthwise of the film, the spacing of the markings of each series having a definite relation to the speed of the film on projection and the action on the film, a tempo change marking of different character than the tempo markings intermediate successive series of tempo markings, warning markings preceding the change markings and of a different character than the tempo markings and tempo change markings, each warning marking being of a different character than the next warning marking.

4. A motion picture film having a plurality of series of tempo markings in the form of holes punched in the frames thereof so as to be visible upon projection of the film, the holes of one series being equally spaced with respect to each other lengthwise of the film, the spacing having a definite relation to the speed of the film on projection and the action on the film, warning markings adjacent the end of the said series of tempo markings, said warning markings being in the form of holes of different character than the tempo holes, tempo change markings following said warning markings, said tempo change markings being in the form of holes of a still different character than the said tempo holes or warning holes, each of said tempo change holes being the first hole of the succeeding series of tempo holes.

5. A motion picture film having a plurality of series of tempo markings comprising a plurality of holes punched in the frames thereof so as to be visible upon projection of the film, the holes of each series being equally spaced lengthwise of the film, the spacing having a definite relation with respect to the speed of the film on projection and the action on the film, the spacing of one series being different from the spacing of adjacent series, tempo change markings intermediate each series of tempo markings, and warning markings immediately preceding said change markings, said warning markings comprising a series of holes in one frame extending transversely of the film, the succeeding frame or frames having a lesser number of holes when the next series of tempo holes is spaced farther apart than the holes of the preceding series, the order of said warning markings being reversed when the next series of tempo holes is spaced closer together than the holes of the preceding series.

This specification signed this 16th day of January, 1931.

DAVE FLEISCHER.